United States Patent [19]
Giffin, III et al.

[11] Patent Number: 6,041,589
[45] Date of Patent: Mar. 28, 2000

[54] ASYMMETRIC TURBOPROP BOOSTER

[75] Inventors: Rollin G. Giffin, III, Cincinnati, Ohio; Joey L. Nelson, Southgate, Ky.

[73] Assignee: General Electric Company, Cincinnati, Ohio

[21] Appl. No.: 09/004,856

[22] Filed: Jan. 9, 1998

[51] Int. Cl.[7] ............................................. F02K 3/02
[52] U.S. Cl. ........................ 60/226.1; 60/226.3; 60/262
[58] Field of Search ........................... 60/226.1, 226.3, 60/262

[56] References Cited

U.S. PATENT DOCUMENTS

| | | | |
|---|---|---|---|
| 3,070,131 | 12/1962 | Wheatley | 60/262 |
| 4,446,696 | 5/1984 | Sargisson et al. | 60/226.3 |
| 4,892,269 | 1/1990 | Greco et al. | 60/262 |
| 5,694,768 | 12/1997 | Johnson et al. | 60/226.3 |
| 5,725,180 | 3/1998 | Chamay et al. | 244/53 B |

FOREIGN PATENT DOCUMENTS

778394A2  6/1997  European Pat. Off. .

*Primary Examiner*—Ted Kim
*Attorney, Agent, or Firm*—Andrew C. Hess; Rodney M. Young

[57] ABSTRACT

A booster-compressor assembly for supercharging air into a core engine that powers propellers of a turboprop aircraft engine includes an asymmetric annular booster duct aft of the propellers and disposed about a centerline with at least one symmetric annular rotor section with a row of rotor blades disposed therein. The booster duct has a booster flowpath that includes a core flowpath to a core engine inlet and a bypass flowpath around the core engine inlet and the flowpaths circumscribed about the centerline and not symmetric with respect to each other. A low bypass flow rate means sets the airflow through the bypass flowpath such that a bypass flow rate per unit area through the bypass flowpath is substantially less than a core flow rate per unit area through the core flowpath.

19 Claims, 5 Drawing Sheets

ASYMMETRIC TURBOPROP BOOSTER

BACKGROUND OF THE INVENTION

1. Field of the Invention

The present invention relates generally to a booster-compressor for a turboprop aircraft engine and particularly concerns an asymmetric turboprop booster and a propeller driven through a gearbox by a gas turbine engine. The booster is provided with an asymmetric inlet and outlet and specially designed rotors and stators which maintain a substantially constant static pressure along streamlines from the booster inlet to the booster outlet.

2. Discussion of the Background Art

In order to increase the thrust developed by conventional gas turbine jet aircraft engines, supercharged air can be driven into the inlet of the core engine, also known as the gas generator, with a booster type compression system. Such a system typically includes several rows of rotor blades and several rows of co-acting stator vanes which raise the pressure of the air entering the core engine allowing it to develop more power while minimizing engine size and weight.

A turboprop engine is generally defined as an engine which does not have a duct surrounding its propeller blades which are typically driven by a turbine through a gearbox and are variable pitch as contrasted with a turbofan engine which is typically defined as an engine which includes a duct surrounding its rotating fan blades and which are typically directly driven by a turbine with no gearbox and are fixed pitch. Because of the differences in operation and design between turbofan engines and turboprop engines, conventional booster designs suitable for use with turbofan engines do not appear to offer significant improvements in the thrust developed by turboprop engines.

Accordingly, a need existed for a booster for supercharging inlet air into the core engine of a turboprop engine using a minimum number of booster stages and a minimum number of blades and vanes. Ideally, a single stage booster having a single row of rotor blades and a single row of stator vanes would produce a significant increase in the pressure of the air introduced into the core engine of a turboprop aircraft engine.

A single stage booster-compressor designed for use with a turboprop aircraft engine that meets this need was developed and disclosed in U.S. Pat. No. 5,345,760 which is incorporated herein by reference. This booster-compressor has a symmetric booster inlet and directs only a portion of its supercharged air into a core inlet of a core engine gas generator of a turboprop engine. The symmetric annular flowpath of the booster-compressor is split into two separate flowstreams at the booster outlet. One flowstream enters the core engine while the other exits the booster-compressor through an exhaust nozzle leading directly into the ambient atmosphere.

The flow which directly enters the atmosphere through the booster exit exhaust nozzle provides supplemental thrust while allowing the cross-sectional area of the flowpath of the booster-compressor to be increased over that area which would be required for providing supercharged air only to the core engine. The increase in flowpath section provided by bypassing a portion of the supercharged air to ambient allows the rotor blades and stator vanes of the booster-compressor to be sized for low blade and vane count and for ease of manufacture and assembly.

This design has a few drawbacks. The Mach number of the flow leaving the booster nozzle is necessarily higher than without the booster because of the pressure input by the booster. This higher Mach number flow scrubs the gas generator nacelle, creates additional drag, and detracts from the thrust produced by the bypassed booster flow. The pressure ratio of the booster is higher than that produced by the propeller. Thrust output per unit power input decreases as exhaust pressure is increased. Accordingly, high pressure in the booster bypass stream is a less efficient way of producing thrust with the same power input to the rotor and/or shaft driving the propeller and booster. This is because the propulsive efficiency of the propeller is higher than the propulsive efficiency of the booster and nozzle combination. Therefore, a propeller and booster design is needed that produces a high pressure ratio for that portion of the flow entering the gas generator inlet and low pressure ratio and low airflow for that portion of the flow bypassing the gas generator inlet. Such a configuration is the subject of the present invention.

SUMMARY OF THE INVENTION

A booster-compressor assembly for supercharging air into a core engine that powers propellers of a turboprop aircraft engine includes an asymmetric annular booster duct aft of the propellers and disposed about a centerline with at least one symmetric annular rotor section with a row of rotor blades disposed therein. The booster duct has a booster flowpath that includes a core flowpath to a core engine inlet and a bypass flowpath around the core engine inlet and the flowpaths circumscribed about the centerline and not symmetric with respect to each other. A low bypass flow rate means sets the airflow through the booster flowpath such that a bypass flow rate per unit area through the bypass flowpath is substantially less than a core flow rate per unit area through the core flowpath.

One embodiment of the booster duct has in axially downstream serial flow communication; an asymmetric annular inlet section, the symmetric annular rotor section, and an asymmetric annular outlet section. The low bypass flow rate means includes bypass inlet guide vanes disposed across the bypass flowpath in the inlet section and circumferentially angled in a flow closing direction at an inlet bypass stagger angle in a rotational direction of the rotor. Core inlet guide vanes may be disposed across the core flowpath in the inlet section and angled in a non closed direction with a core stagger angle that is not in the rotational direction of the rotor. The low bypass flow rate means may further include a booster duct inlet having a full circular inner inlet surface at a constant inner radius circumscribed about the centerline. The booster duct inlet may further include core and bypass annular inlet sectors to the core and bypass flowpaths having a core and bypass radial heights respectively as measured radially outward from the inner inlet surface such that the core radial height is greater than the bypass radial height.

A more particular embodiment of the invention provides that the row of rotor blades is a row of sub-sonic impulse rotor blades that cause a first static pressure of the air at a rotor outlet of the row of impulse rotor blades to be substantially equal to a second static pressure of the air at a rotor inlet of the row of impulse rotor blades. A row of exit guide vanes are disposed across the duct flowpath aft of the row of impulse rotor blades and the core and bypass flowpaths are axially-converging along the exit guide vanes so as to cause a third static pressure of the air at an exit guide vane inlet of the row of exit guide vanes to be substantially equal to a fourth static pressure of the air at an exit guide vane exit of the row of exit guide vanes through an operating range of the turboprop aircraft engine. The booster flowpath has a constant cross-sectional area along the impulse rotor blades and each of the impulse rotor blades includes an inlet angle equal to an exit angle.

Another embodiment of the invention includes a thrust producing nozzle aft of the row of exit guide vanes along the bypass flowpath. A diffuser may be disposed between the bypass annular inlet sector and the annular rotor section along the bypass flowpath. The diffuser may be disposed in the inlet section.

The low bypass flow rate means may further include the row of exit guide vanes having core and bypass exit guide vanes disposed across the core and bypass flowpaths respectively, the core and bypass exit guide vanes circumferentially angled at core and bypass stagger angles respectively, and the bypass stagger angle being greater than the core stagger angle.

A propeller hub drivingly connected to the propeller may be used and have the impulse rotor blades mounted to the hub such that the hub provides a cylindrical inner surface of the booster flowpath through the inlet section and the rotor section.

ADVANTAGES OF THE INVENTION

The present invention provides a highly efficient turboprop aircraft engine that has the advantages of the turboprop engine in U.S. Pat. No. 5,345,760 but is more efficient because the air flow through the bypass flowpath which directly enters the atmosphere through the nozzle provides a smaller percentage of the overall thrust. The low bypass flow rate means allows more power from the core engine to go to the propellers which have a higher propulsive efficiency than the nozzle thereby providing better efficiency than turboprop engines in the prior art. The present invention therefore, produces a high pressure ratio for that portion of the flow entering the gas core engine through the core flowpath and a low pressure ratio and low airflow rate per unit area for that portion of the flow bypassing the core engine and passing through the bypass flowpath. This allows the rotor blades and stator vanes of the booster-compressor to be sized for low blade and vane count and for ease of manufacture and assembly as in U.S. Pat. No. 5,345,760 and have a higher overall propulsive efficiency.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
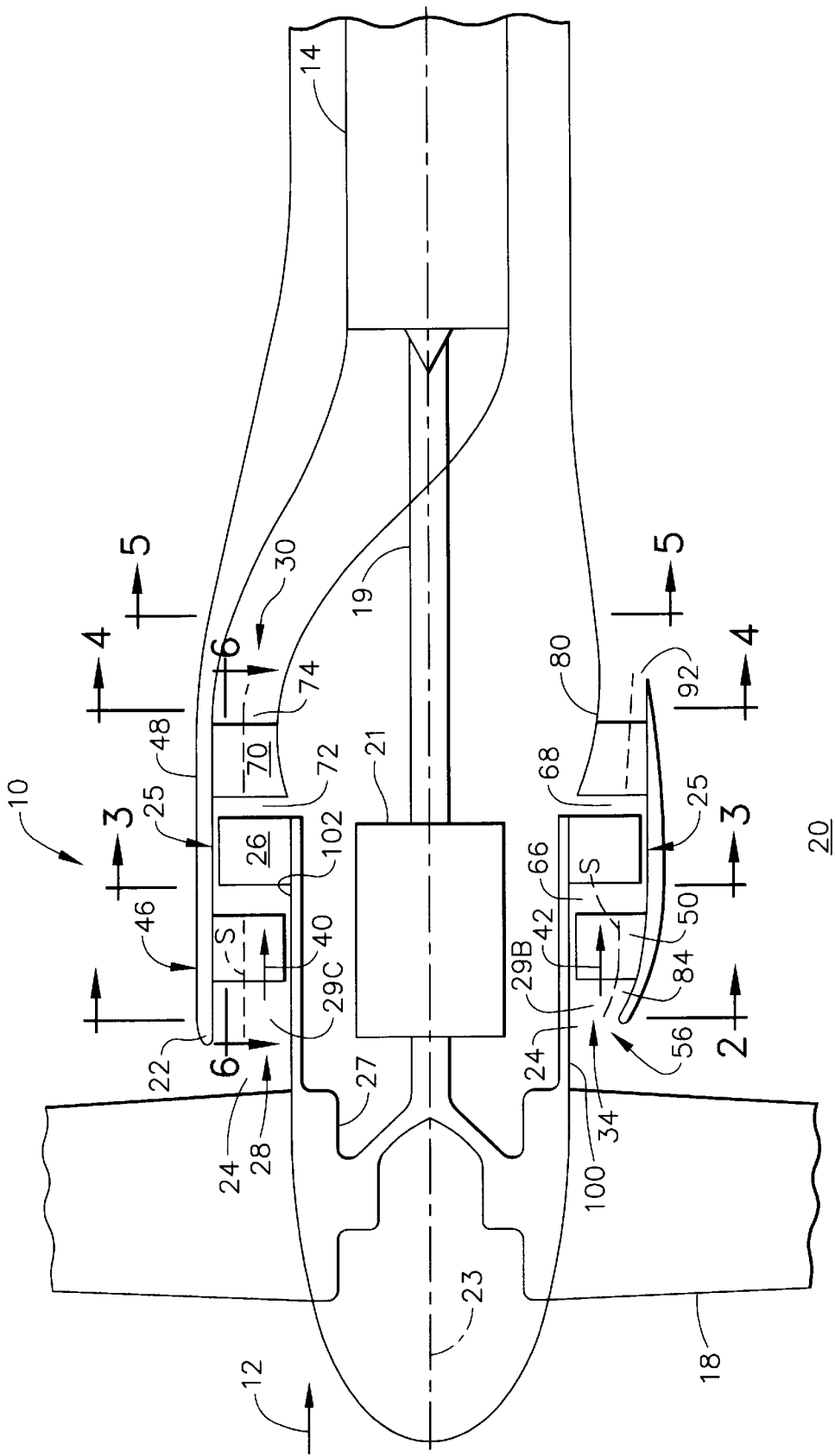
FIG. 1 is a partial schematic view in axial section illustrating a turboprop booster in accordance with an exemplary embodiment of the present invention.
Figure 3:
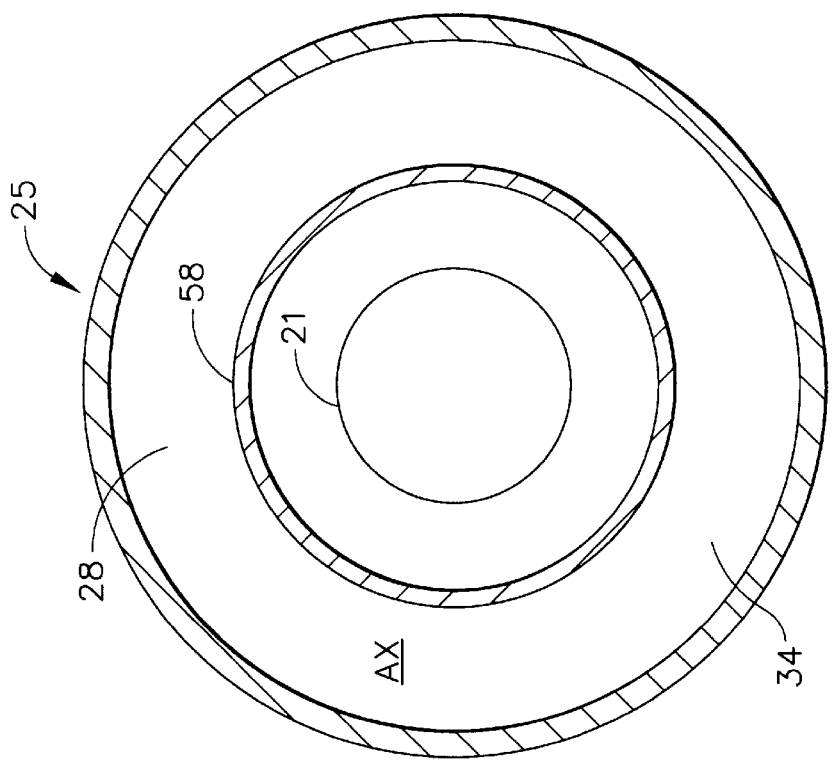
FIG. 3 is a sectional view taken along section 3—3 in FIG. 1 illustrating a rotor inlet in accordance with the exemplary embodiment of the present invention in FIG. 1.
Figure 2:
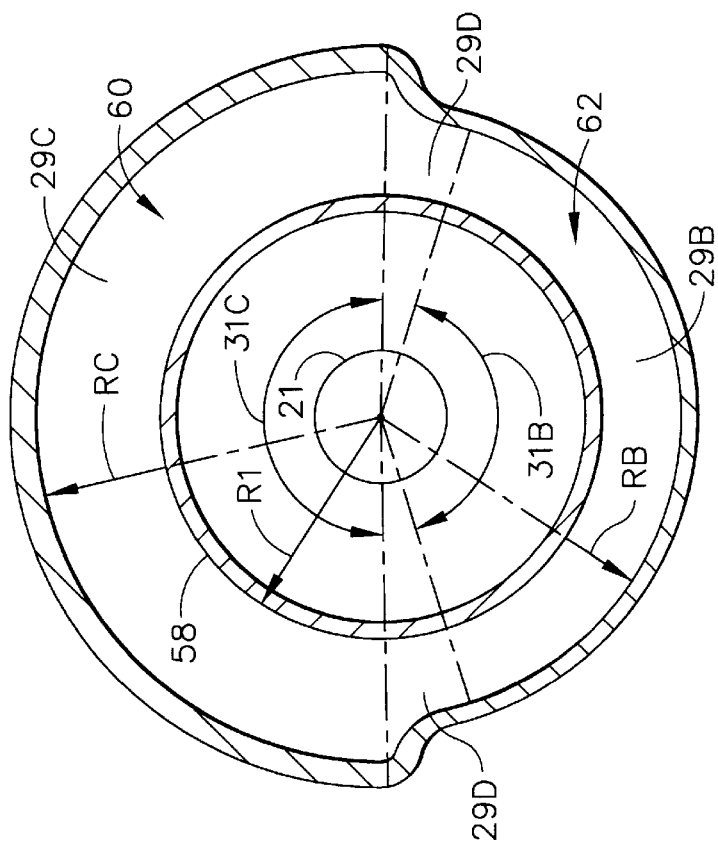
FIG. 2 is a sectional view taken along section 2—2 in FIG. 1 illustrating core and bypass annular inlet sectors in accordance with a more particular embodiment of the present invention.

FIG. 1 illustrates a booster-compressor assembly 10 for supercharging air 12 into a core engine 14 that powers propellers 18 by a shaft 19 through a gearbox 21 of a turboprop aircraft engine 20. An asymmetric annular booster duct 22 is disposed about a centerline 23 of the shaft 19 and the gearbox 21 and is positioned aft (or downstream with respect to direction of air 12) of the propellers. The booster duct 22 has at least one symmetric annular rotor section 25 with a row of rotor blades 26 disposed on a rotor 27 therein. The booster duct 22 has a booster flowpath 24 that includes a core flowpath 28 to a core engine inlet 30 (which takes the place of a more conventional chin inlet) and a bypass flowpath 34 around the core engine inlet. The core and bypass flowpaths 28 and 34 include core and bypass annular sectors 29C and 29B, respectively, as illustrated in FIG. 2 and are circumscribed about the centerline 23 and the core and bypass elements are not symmetric with respect to each other except through the rotor section 25 as illustrated in FIG. 3. The core and bypass annular sectors 29C and 29B are axially extending sectors of annuli that extend through core and bypass included angles 31C and 31B, respectively. The core and bypass annular sectors 29C and 29B have transition sectors 29D between them. A low bypass flow rate means sets the air through the bypass flowpath 34 such that a bypass flow rate 42 per unit area through the bypass flowpath is substantially less than a core flow rate 40 per unit area through the core flowpath 28. Typically, flow rate is mass flow rate such as for example in pounds per second and the area is perpendicular to the flow velocity vector. The mass flow rate per unit area for this example has dimensions in pounds mass per second per foot squared [lb/(sec ft$^2$)] or its equivalent.

Figure 6:
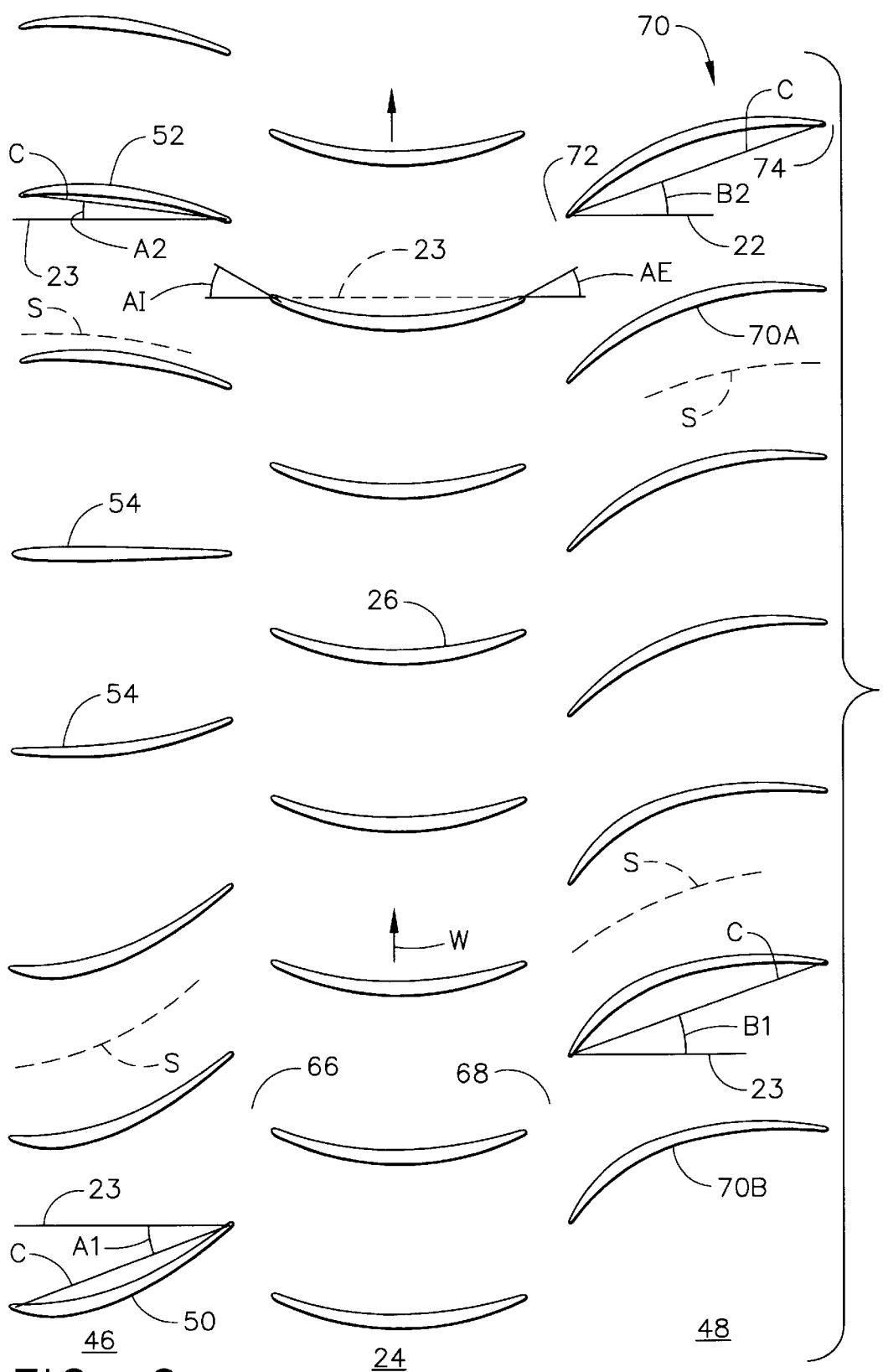
FIG. 6 is a diagrammatic cross-sectional illustration along 6—6 in FIG. 1 of guide vanes and rotor blades laid out flat.

The booster duct 22 has, in axially downstream serial flow communication, an asymmetric annular inlet section 46, the symmetric annular rotor section 25, and an asymmetric annular outlet section 48. The low bypass flow rate means may include bypass inlet guide vanes 50 disposed across the bypass flowpath 34 in the inlet section 46 and circumferentially angled in a flow closing direction at an inlet bypass stagger angle A1 in a rotational direction W of the rotor 27 as illustrated in FIG. 6. Stagger angle is defined as an angle between chord C of the blades 26 and the centerline 23 about which the blades rotate. Closure is not a full closing off of the air through the bypass flowpath 34 but rather refers to closing or setting the inlet bypass stagger angle A1 to a closed position. The closed position is indicated by the position and closed inlet bypass stagger angle A1 of the bypass inlet guide vanes 50 as contrasted to the open position and an open inlet core stagger angle A2 of core inlet guide vanes 52. A nominal position, one for which the stagger angle A1 is 0 degrees is also shown. The open position allows a greater flow rate while a closed position restricts the flow and causes a relative lower flow rate per unit area.

Core inlet guide vanes 52 may be disposed across the core flowpath 28 in the inlet section 46 and angled in a non closed direction with a core stagger angle A2 that is not in the rotational direction W of the rotor. Transition inlet guide vanes 54 may be disposed across the transition sectors 29D of the booster flowpath 24 in the inlet section 46 to help transit the flow between the core and bypass flowpaths in the inlet section. Closing down or restricting flow around the entire circumference of a duct by adjusting the stagger angle of vanes across the flowpath of the duct are well known in the art for reducing flow rate per unit area. Thus the low bypass flow rate means may employ relatively open booster inlet guide vanes and closed bypass inlet guide vanes to set the airflow through the booster flowpath such that the bypass flow rate per unit area through the bypass flowpath is substantially less than the core flow rate per unit area through the core flowpath. The low bypass flow rate means may alternatively employ no booster inlet guide vanes and only closed bypass inlet guide vanes to set the airflow through the booster flowpath such that the bypass flow rate per unit area through the bypass flowpath is substantially less than the core flow rate per unit area through the core flowpath.

Referring to FIGS. 1 and 2, the booster duct 22 may further include a booster duct inlet 56 having a full circular inner inlet surface 58 at a constant inner radius R1 circumscribed about the centerline 23. The booster duct inlet 56 may further include core and bypass inlet area sectors 60 and 62, respectively, to the core and bypass flowpaths 28 and 34, respectively, at the beginning of the core and bypass annular sectors 29C and 29B, respectively. The core and bypass inlet area sectors 60 and 62 have core and bypass radial heights RC and RB, respectively, as measured radially outward from the inner inlet surface 58 such that the core radial height is greater than the bypass radial height and thus serves as an additional low bypass flow rate means which can be used alone or with other low bypass flow rate means as in the exemplary embodiment illustrated herein.

A more particular embodiment of the invention provides that the row of rotor blades 26 (or rows if more than one row of blades are used) is a row of sub-sonic impulse rotor blades that cause a first static pressure of the air at a rotor outlet 68 of the row of impulse rotor blades to be substantially equal to a second static pressure of the air at a rotor inlet 66 of the row of impulse rotor blades along a constant streamline S. A row of exit guide vanes 70 are disposed across the booster flowpath 24 aft of the row of impulse rotor blades 26 and the core and bypass flowpaths 28 and 34, respectively, are axially-converging along the exit guide vanes so as to cause a third static pressure of the air at an exit guide vane inlet 72 of the row of exit guide vanes to be substantially equal to a fourth static pressure of the air at an exit guide vane exit 74 along the streamline S of the row of exit guide vanes through a design operating range of the turboprop aircraft engine which is typically cruise for the booster. The booster flowpath has a constant cross-sectional area AX, as illustrated in FIG. 3, along the impulse rotor blades 26 and each of the impulse rotor blades includes an inlet angle AI equal to an exit angle AE with respect to the centerline 23.

Figure 4:
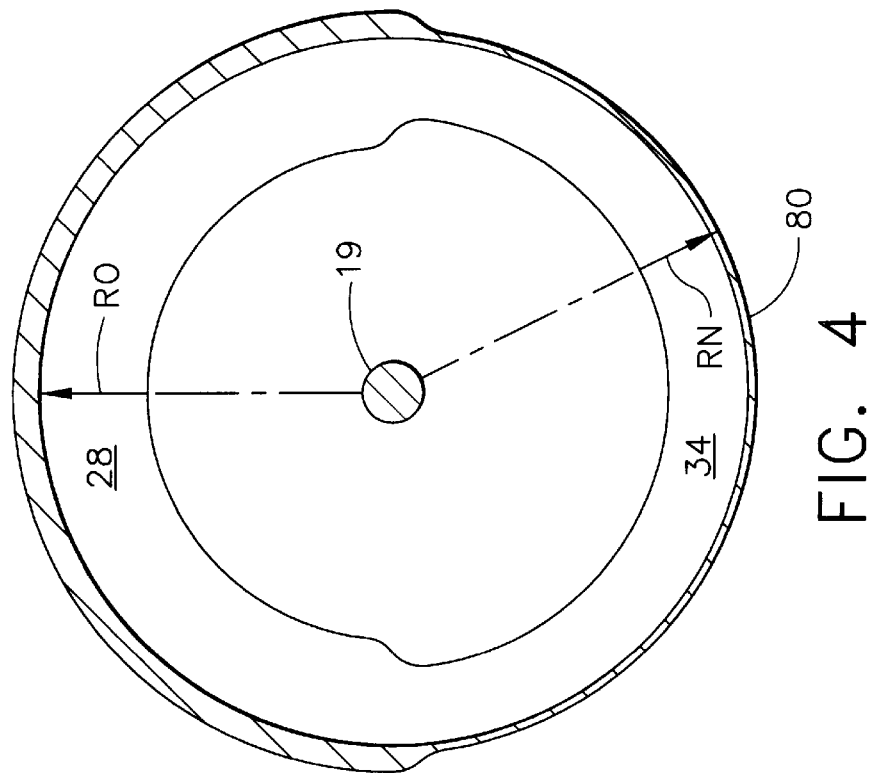
FIG. 4 is a sectional view taken along section 4—4 in FIG. 1 illustrating a thrust producing nozzle aft of the row of exit guide vanes along the bypass flowpath in accordance with the exemplary embodiment of the present invention in FIG. 1.

Another embodiment of the present invention provides a thrust producing nozzle 80 aft of the row of exit guide vanes 70 along the bypass flowpath 34. The axially converging portion of the bypass flowpath 34 along the exit guide vanes 70 provide a convergent portion of the nozzle 80. In order to accommodate the bypass flow rate 42 per unit area being substantially less than the core flow rate 40 per unit area aft of the rotor section 25 and the pressure and velocity parameters discussed above the cross-sectional areas of the core and bypass flowpaths 28 and 34 must be properly sized such as at the axial position of the nozzle 80 as illustrated in FIG. 4. The flow rate per unit area through the bypass flowpath 34 is set in accordance with the present invention by appropriately sizing a nozzle radial height RN through the bypass flowpath and an outlet radial height RO to maintain efficient flow conditions and the bypass flow rate 42 per unit area substantially less than the core flow rate 40 per unit area through the booster flowpath 24 between the rotor section 25 and a nozzle exit 92.

The air flow through the bypass flowpath which directly enters the atmosphere through the nozzle provides some supplemental thrust while allowing the cross-sectional area of the flowpath of the booster-compressor to be increased over that area which would be required for providing supercharged air only to the core engine. This increase in core flowpath cross-sectional area, as indicated by the core inlet area sectors 60, is provided by bypassing a portion of the supercharged air to ambient and allows the rotor blades and stator vanes of the booster-compressor to be sized for low blade and vane count and for ease of manufacture and assembly. The low bypass flow rate means allows more power from the core engine to go to the propellers which have a higher propulsive efficiency than the nozzle. The present invention therefore, produces a high pressure ratio for that portion of the flow entering the gas core engine through the core flowpath and a low pressure ratio and low airflow rate per unit area for that portion of the flow bypassing the core engine and passing through the bypass flowpath.

A diffuser 84 in the form of an axially diverging portion of the bypass flowpath 34 may be disposed in the asymmetric annular inlet section 46 between the bypass inlet area sector 62 and the annular rotor section 25 and may include all or part of the portion along the bypass flowpath that contains the bypass inlet guide vanes 50.

The low bypass flow rate means may further include having core and bypass exit guide vanes 70A and 70B, respectively, circumferentially angled at core and bypass stagger angles B2 and B1, respectively, such that the bypass stagger angle B1 is greater than the core stagger angle B2. This is done to match flow conditions set up by the bypass stagger angle A1 to set the flow rate per unit area through the bypass inlet guide vanes 50 and to match flow conditions set up by the relatively open inlet core stagger angle A2.

The propellers 18 are preferably mounted on a propeller hub 100 that is in turn mounted to the shaft 19 such that the core engine 14 drivingly powers the propellers through the gearbox 21. The impulse rotor blades 26 are mounted to the hub 100 such that the hub provides a cylindrical inner surface 102 of the booster flowpath 24 through the inlet section 46 and the rotor section 25.

Figure 5:
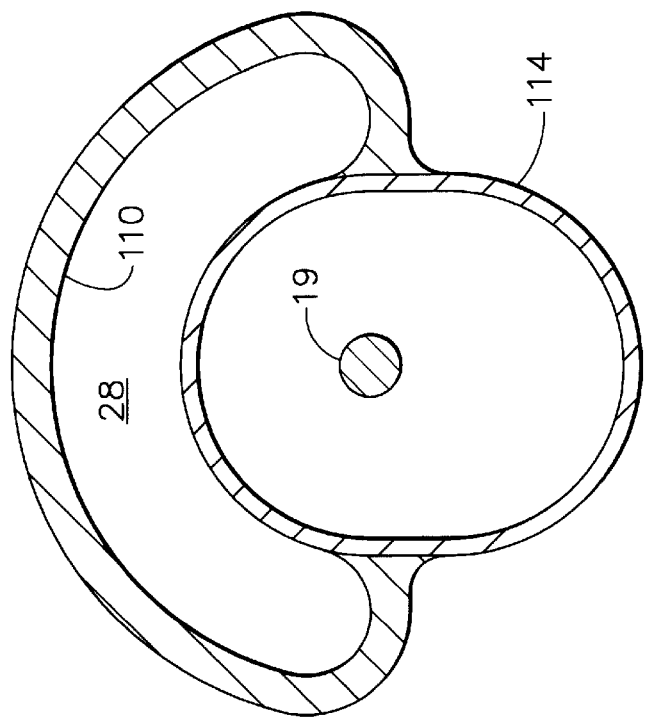
FIG. 5 is a sectional view taken along section 5—5 in FIG. 1 illustrating a transition duct to the core engine in accordance with the exemplary embodiment of the present invention in FIG. 1.

The air through the core flowpath 28 enters a transition duct 110 at the core engine inlet 30 and the transition duct is integrated into an exterior cowling 114. The air through the bypass flowpath 34 exits the booster duct 22 through the nozzle 80 exterior to the cowling 114 as illustrated in FIG. 5.

Figure 7:
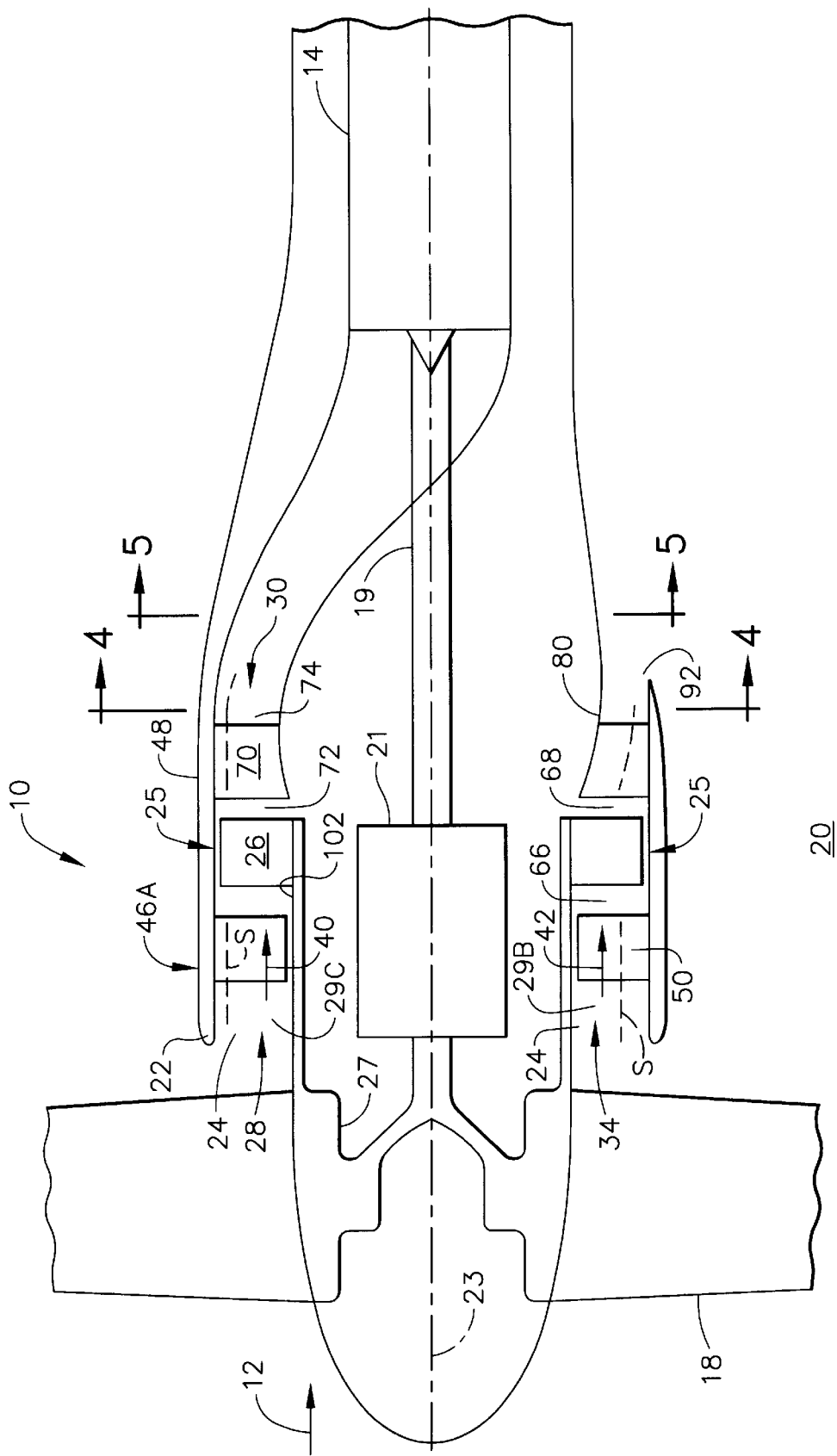
FIG. 7 is a partial schematic view in axial section illustrating an alternate turboprop booster in accordance with a second embodiment of the present invention.

Illustrated in FIG. 7 is an alternate embodiment of the booster duct 22 having a symmetric annular inlet section 46A. The core and bypass inlet area sectors 60 and 62 have equal core and bypass radial heights RC and RB, respectively to reduce or eliminate spillage drag that may result from the unequal core and bypass radial heights configuration illustrated in FIGS. 1 and 2. The low bypass flow rate means in this symmetric annular inlet section embodiment use the relatively closed bypass inlet guide vanes 50 and the relatively open inlet core inlet guide vanes 52 illustrated in FIG. 6 as explained above and the equal core and bypass radial heights RC and RB results in the booster duct inlet 56 resembling the cross-sectional illustration in FIG. 3. The relatively open position of the inlet guide vanes allows a greater flow rate while the relatively closed position restricts the flow and causes a lower flow rate per unit area.

While the preferred embodiment of our invention has been described fully in order to explain its principles, it is understood that various modifications or alterations may be made to the preferred embodiment without departing from the scope of the invention as set forth in the appended claims.

What is claimed is:

1. A booster-compressor assembly for supercharging air into a core engine that powers propellers of a turboprop aircraft engine, said assembly comprising:

a partially asymmetric annular booster duct aft of the propellers disposed about a centerline;

said booster duct having at least one symmetric annular rotor section with a row of rotor blades disposed therein;

said booster duct having a booster flowpath including a core flowpath to a core engine inlet and a bypass flowpath around said core engine inlet, said flowpaths circumscribed about said centerline and not symmetric with respect to each other; and a low bypass flow rate means for setting booster flow rate through said booster flowpath such that a bypass flow rate per unit area through said bypass flowpath is substantially less than a core flow rate per unit area through said core flowpath.

2. An assembly as claimed in claim 1, further comprising:

said booster duct having in axially downstream serial flow communication, an asymmetric annular inlet section, said symmetric annular rotor section, and an asymmetric annular outlet section, said low bypass flow rate means comprising bypass inlet guide vanes disposed across said bypass flowpath in said inlet section, and said bypass inlet guide vanes circumferentially angled in a flow closing direction at an inlet bypass stagger angle in a rotational direction of said rotor.

3. An assembly as claimed in claim 2, further comprising core inlet guide vanes disposed across said core flowpath in said inlet section and said core inlet guide vanes circumferentially angled in a non closed direction with a core stagger angle not in said rotational direction of said rotor.

4. An assembly as claimed in claim 3, said low bypass flow rate means further comprising;

a booster duct inlet having a circular inner inlet surface of a constant inner radius, core and bypass annular inlet sectors to said core and bypass flowpaths respectively, said core and bypass annular inlet sector having a core and bypass radial heights as measured radially outward from said inner inlet surface, and said core radial height greater than said bypass radial height.

5. An assembly as claimed in claim 2, said low bypass flow rate means further comprising;

a booster duct inlet having a circular inner inlet surface of a constant inner radius, core and bypass annular inlet sectors to said core and bypass flowpaths respectively, said core and bypass annular inlet sector having a core and bypass radial heights as measured radially outward from said inner inlet surface, and said core radial height greater than said bypass radial height.

6. An assembly as claimed in claim 1, further comprising:

said row of rotor blades comprising a row of sub-sonic impulse rotor blades, said row of impulse rotor blades causing a first static pressure of the air at an outlet of said row of impulse rotor blades to be substantially equal to a second static pressure of the air at an inlet of said row of impulse rotor blades along streamlines through said booster flowpath throughout an operating range of the turboprop aircraft engine;

a row of exit guide vanes aft of said row of impulse rotor blades;

said core and bypass flowpaths being axially-converging flowpath along said exit guide vanes so as to cause the static pressure of said air at an exit of said row of exit guide vanes to be substantially equal to the static pressure of said air at an entrance of said row of exit guide vanes along said streamlines through an operating range of said turboprop aircraft engine; and said booster flowpath having a constant cross-sectional area along said impulse rotor blades and each of said impulse rotor blades includes an inlet angle and an exit angle, said inlet angle being equal to said exit angle.

7. An assembly as claimed in claim 6, further comprising a thrust producing nozzle aft of said row of exit guide vanes and along said bypass flowpath.

8. An assembly as claimed in claim 7, further comprising a diffuser disposed between said bypass annular inlet sector and said annular rotor section along said bypass flowpath.

9. An assembly as claimed in claim 8, said low bypass flow rate means further comprising:

said row of exit guide vanes having core and bypass exit guide vanes disposed across said core and bypass flowpaths respectively, said core and bypass exit guide vanes circumferentially angled at core and bypass stagger angles respectively, and said bypass stagger angle greater than said core stagger angle.

10. An assembly as claimed in claim 9, further comprising said diffuser disposed in said inlet section.

11. An assembly as claimed in claim 10, further comprising:

a propeller hub drivingly connected to said propeller, said impulse rotor blades mounted to said hub, and said hub providing a cylindrical inner surface of said booster flowpath through said inlet section and said rotor section.

12. An assembly as claimed in claim 1, further comprising:

a propeller hub drivingly connected to said propeller, said impulse rotor blades mounted to said hub, said hub providing a cylindrical inner surface of said booster flowpath through said inlet section and said rotor section, and said booster duct having cylindrical outer core and bypass surfaces along said core and bypass flowpaths through said inlet section and said rotor section.

13. An assembly as claimed in claim 12, further comprising:
a propeller hub drivingly connected to said propeller,
said impulse rotor blades mounted to said hub, and
said hub provides a cylindrical inner surface of said booster flowpath.

14. An assembly as claimed in claim 13, further comprising:
said booster duct having in axially downstream serial flow communication, an asymmetric annular inlet section, said symmetric annular rotor section, and an asymmetric annular outlet section,
said low bypass flow rate means comprising bypass inlet guide vanes disposed across said bypass flowpath in said inlet section, and
said bypass inlet guide vanes circumferentially angled in a flow closing direction at an inlet bypass stagger angle in a rotational direction of said rotor.

15. An assembly as claimed in claim 14, further comprising core inlet guide vanes disposed across said core flowpath in said inlet section and said core inlet guide vanes circumferentially angled in a non closed direction with a core stagger angle not in said rotational direction of said rotor.

16. An assembly as claimed in claim 15, said low bypass flow rate means further comprising:
a booster duct inlet having a circular inner inlet surface of a constant inner radius,
core and bypass annular inlet sectors to said core and bypass flowpaths respectively,
said core and bypass annular inlet sector having a core and bypass radial heights as measured radially outward from said inner inlet surface, and
said core radial height greater than said bypass radial height.

17. An assembly as claimed in claim 13, further comprising:
said booster duct having in axially downstream serial flow communication, a symmetric annular inlet section, said symmetric annular rotor section, and an asymmetric annular outlet section,
said low bypass flow rate means comprising bypass inlet guide vanes disposed across said bypass flowpath in said inlet section, and
said bypass inlet guide vanes circumferentially angled in a flow closing direction at an inlet bypass stagger angle in a rotational direction of said rotor.

18. An assembly as claimed in claim 17, further comprising core inlet guide vanes disposed across said core flowpath in said inlet section and said core inlet guide vanes circumferentially angled in a non closed direction with a core stagger angle not in said rotational direction of said rotor.

19. An assembly as claimed in claim 18, further comprising;
a booster duct inlet having a circular inner inlet surface of a constant inner radius,
core and bypass annular inlet sectors to said core and bypass flowpaths respectively,
said core and bypass annular inlet sector having a core and bypass radial heights as measured radially outward from said inner inlet surface, and
said core radial height equal to said bypass radial height.

* * * * *